United States Patent [19]

Kato

[11] Patent Number: 5,025,401

[45] Date of Patent: Jun. 18, 1991

[54] AUTOMOTIVE MILEAGE CALCULATING APPARATUS

[75] Inventor: Takahiro Kato, Saitama, Japan

[73] Assignee: Pioneer Electronic Corporation, Tokyo, Japan

[21] Appl. No.: 486,703

[22] Filed: Feb. 28, 1990

[30] Foreign Application Priority Data

Oct. 17, 1989 [JP] Japan .................................. 1-268052

[51] Int. Cl.$^5$ .......................... G01C 21/00; G06F 7/70
[52] U.S. Cl. ................................. 364/561; 364/426.03; 377/24.1; 324/171; 180/197
[58] Field of Search ................ 364/550, 561, 565, 566, 364/571.01, 426.03; 324/161, 162, 171; 377/24.1; 180/197; 235/95 R, 96

[56] References Cited

U.S. PATENT DOCUMENTS

| | | | |
|---|---|---|---|
| 4,328,413 | 5/1982 | O'Neil et al. | 364/561 X |
| 4,651,290 | 3/1987 | Masaki et al. | 364/566 X |
| 4,665,497 | 5/1987 | Yamamura et al. | 364/561 |
| 4,670,852 | 6/1987 | Masaki et al. | 324/161 X |
| 4,682,287 | 7/1987 | Mizuno et al. | 364/561 |
| 4,697,278 | 9/1987 | Fleischer | 364/561 X |
| 4,843,552 | 6/1989 | Inagaki | 364/426.03 |

Primary Examiner—Joseph L. Dixon
Attorney, Agent, or Firm—Sughrue, Mion, Zinn Macpeak & Seas

[57] ABSTRACT

An automotive mileage calculating apparatus of this invention consists of a vehicle speed sensor, an acceleration sensor, a slip detecting circuit, and a mileage calculating circuit. The slip detecting circuit detects a wheel slip either by comparing the accelerations calculated from the vehicle speed sensor's speed signal and from the acceleration sensor's acceleration signal; by comparing the vehicle speeds calculated from the vehicle speed sensor's speed signal and from the acceleration sensor's acceleration signal; or by comparing the mileages calculated from the vehicle speed sensor's speed signal and from the acceleration sensor's acceleration signal. During normal running, the mileage is calculated by using the speed sensor's speed signal. When a wheel slip is detected, the mileage calculation is performed by using the acceleration sensor's acceleration signal, thus giving a correct mileage.

6 Claims, 5 Drawing Sheets

AUTOMOTIVE MILEAGE CALCULATING APPARATUS

BACKGROUND OF THE INVENTION

1. Field of the Invention

The present invention relates to an automotive mileage calculating, and more specifically, one that calculates the distance traveled by the car in real time.

2. Description of the Prior Art

In conventional automotive mileage calculating apparatuses, a vehicle speed sensor that generates a speed signal representing the vehicle speed is mounted to the driving wheel or to the driven gear of the transmission and the speed signal outputted from the vehicle speed sensor are integrated with time to calculate the distance traveled by the car.

3. Problems to be Solved by the Invention

With the conventional method of calculating the mileage by using the vehicle speed sensor, although there is no problem when the car is running normally, a problem arises when it is running on snow-covered, frozen or muddy roads. In such roads, the wheel may easily slip, producing incorrect car speed signals, so that a correct mileage cannot be obtained.

The present invention has been accomplished under these circumstances and is intended to provide an automotive mileage calculating apparatus that can calculate a correct mileage even when the vehicle wheels are slipping on bad conditioned roads.

SUMMARY OF THE INVENTION

To achieve the above objective, the present invention provides an automotive mileage calculating apparatus which comprises: a vehicle speed sensor for generating a vehicle speed signal according to the running speed of the vehicle; an acceleration sensor for detecting the acceleration of the vehicle in the direction of travel; a slip detecting circuit for detecting a wheel slip according to the speed signal from the vehicle speed sensor and the acceleration signal from the acceleration sensor; and a mileage calculating circuit for calculating the mileage, the mileage calculating circuit being adapted to compute the mileage by using the speed signal from the vehicle speed sensor when there is no wheel slip and, when there is a wheel slip, by using the acceleration signal from the acceleration sensor.

To detect a wheel slip by the slip detecting circuit, the following three methods are available: a method of comparing accelerations as determined from the vehicle speed sensor and from the acceleration sensor; a method of comparing car speeds as obtained from the speed sensor and from the acceleration sensor; and a method of comparing distances traveled as calculated from the speed sensor and from the acceleration sensor.

When the car is running normally, the distance traveled or mileage is calculated by using the speed signal generated by the vehicle speed sensor, as in the conventional apparatus. When the wheels slip, the slip detecting circuit detects the slip and switches the input to the mileage calculation circuit to become the acceleration signal outputted from the acceleration sensor. Therefore, the automotive mileage calculating apparatus can determine a correct mileage during a wheel slip, as well as during the normal running operation.

These and other objects and features of this invention will be described in detail by referring to the accompanying drawings illustrating one embodiment of the invention and the description thereof.

DESCRIPTION OF THE PREFERRED EMBODIMENT

Now this invention will be described by referring to the accompanying drawings that illustrate one embodiment of the invention.

Figure 1:
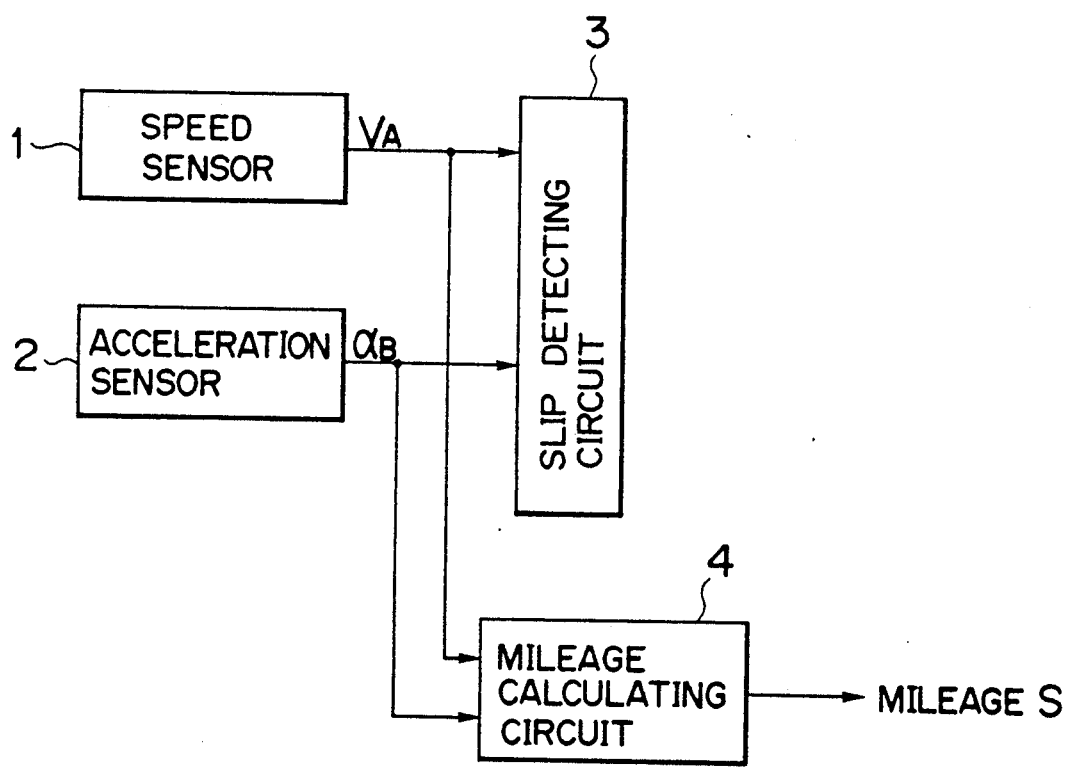
FIG. 1 is a block diagram of one embodiment of this invention.

FIG. 1 shows an automotive mileage calculating apparatus as one embodiment of this invention. In the figure, reference numeral 1 represents a vehicle speed sensor that generates a vehicle speed pulse $V_A$ of a frequency corresponding to the speed of the car. An acceleration sensor 2 measures the acceleration of the vehicle in the direction of travel, $\alpha_B$. Slip detecting circuit 3 detects a wheel slip according to the speed pulse $V_A$ outputted from the speed sensor 1 and the acceleration signal $\alpha_B$ outputted from the acceleration sensor 2. A circuit 4 is a mileage calculating circuit, which calculates the distance traveled by using the speed pulse $V_A$ from the speed sensor 1 when no slip occurs and, when the wheels are slipping, calculates the mileage by using the acceleration signal $\alpha_B$ from the acceleration sensor. The speed sensor 1 is coupled to the drive wheel of the car or to the driven gear of the transmission. The acceleration sensor 2 is installed in a predetermined location in the car, such as in the engine area.

The speed pulse $V_A$ outputted from the speed sensor 1 and the acceleration signal $\alpha_B$ outputted from the acceleration sensor 2 are each supplied to the slip detecting circuit 3 and to the mileage calculating circuit 4. The slip detecting circuit 3, according to the speed pulse $V_A$ and the acceleration signal $\alpha_B$, monitors the system for a wheel slip according to a method to be described later.

When no wheel slip is occurring, the slip detecting circuit 3 outputs a no-slip signal to the mileage calculating circuit 4. While the no-slip signal is being received, the mileage calculating circuit 4 processes the speed pulse $V_A$ outputted from the speed sensor 1, as in the conventional apparatus, to calculate the distance traveled S according to the expression (1) shown below.

$$S = N \times \delta \qquad (1)$$

where N is the total number of pulses output from speed sensor 1 and $\delta$ is the distance represented by a single pulse.

When the wheels slip, it is detected by the slip detecting circuit 3, which then outputs a slip detection signal to the mileage calculating circuit 4. Upon reception of the slip detection signal, the mileage calculating circuit 4 operates according to the following equation (2) to determine the mileage S. The equation (2) involves the acceleration signal $\alpha_B$ from the acceleration sensor 2, instead of the car speed pulse $V_A$ from the speed sensor 1.

$$S = \int (\int \alpha_B dt + v) dt \qquad (2)$$

where v is the vehicle speed when the integration is initiated.

Thus, when the slip occurs, the calculation of the mileage is carried out using the acceleration signal $\alpha_B$ output from the acceleration sensor 2 located in the engine area and therefore is not affected by the wheel slip, so that a correct mileage can be determined.

Next, a process of detecting the wheel slip as performed by the slip detecting circuit 3 will be explained.

Figure 2:
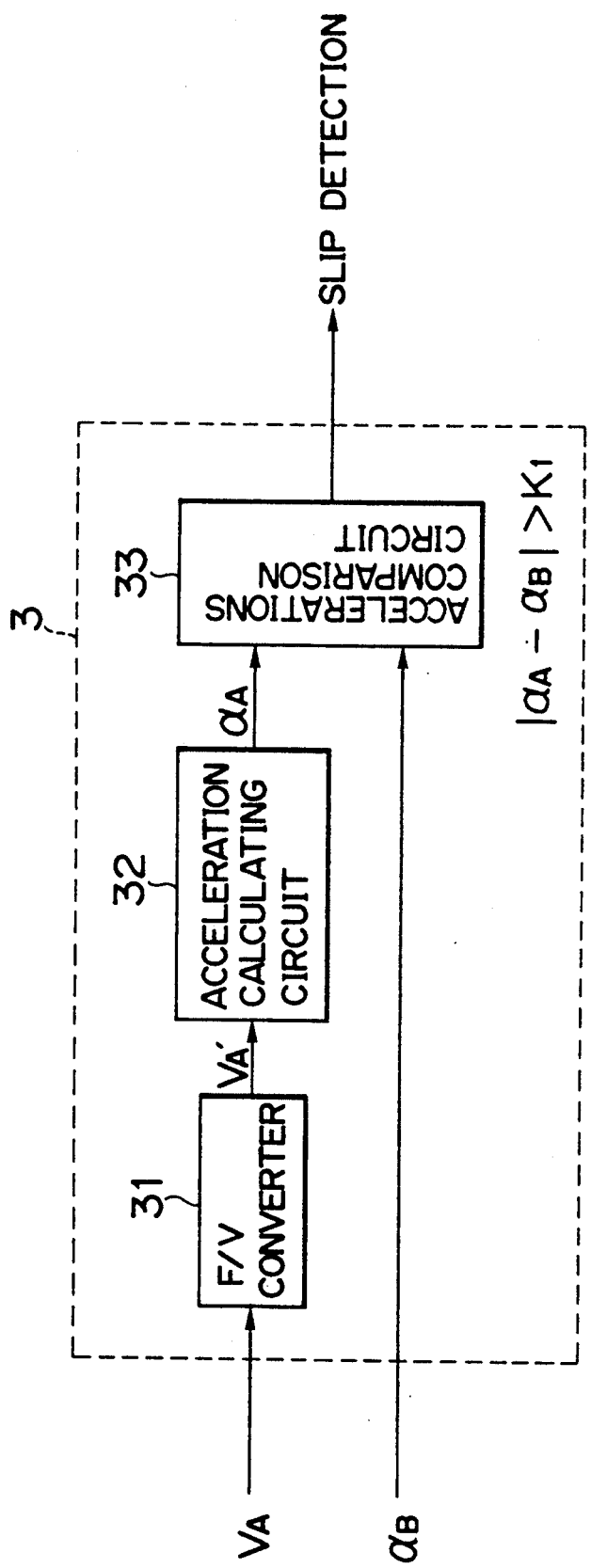
FIG. 2 is a configuration of the slip detecting circuit that employs an acceleration comparison method.

FIG. 2 shows an example method of detecting a wheel slip by processing the acceleration $\alpha_A$ calculated from the speed pulse $V_A$ generated by the speed sensor 1 and the acceleration $\alpha_B$ output from the acceleration sensor 2.

The car speed pulse $V_A$ generated by the speed sensor 1 is converted by an F/V (frequency-to-voltage) converter 31 into a voltage signal whose amplitude is proportional to the car speed. The converted speed signal $V_A'$ is then fed to an acceleration calculating circuit 32, which processes the voltage signal $V_A'$ to determine an acceleration $\alpha_A$ from an equation (3).

$$\alpha_A = dV_A'/dt \qquad (3)$$

The acceleration thus obtained $\alpha_A$ and the acceleration $\alpha_B$ detected by the acceleration sensor 2 are sent to an acceleration comparison circuit 33, where they are compared according to an expression (4).

$$|\alpha_A - \alpha_B| > K_1 \qquad (4)$$

where $K_1$ is a threshold value for slip detection.

When there is no slip, the output of the speed sensor 1 changes strictly in accordance with actual vehicle speed variations and thus the values of $\alpha_A$ and $\alpha_B$ in the formula (4) become almost equal to each other, i.e., $|\alpha_A - \alpha_B| \leq K_1$. When on the other hand the wheels slip, the output of the speed sensor 1 changes more greatly than the actual vehicle speed change. Hence, a large difference occurs between $\alpha_A$ and $\alpha_B$ in the equation (4), i.e., $|\alpha_A - \alpha_B| > K_1$. In this way, the wheel slip can be detected by checking whether or not the equation (4) holds.

Figure 3:
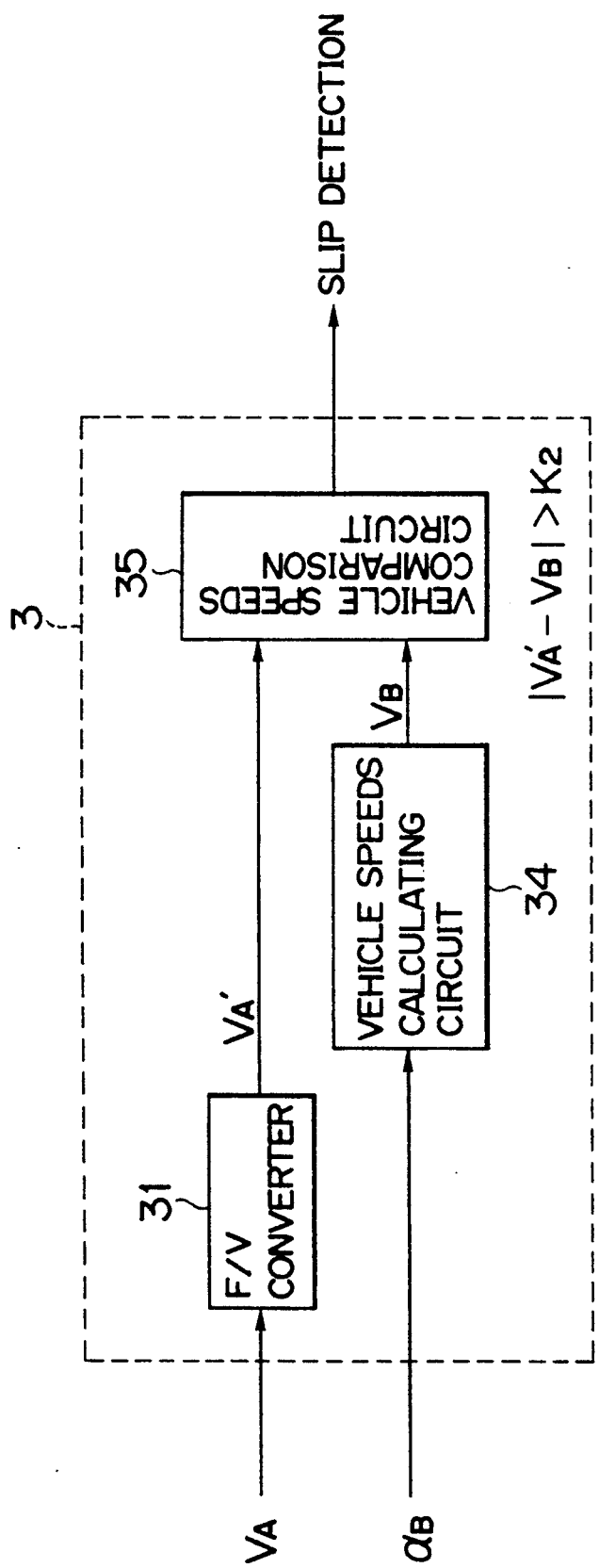
FIG. 3 is a configuration of the slip detecting circuit that employs a speed comparison method.

FIG. 3 shows a process of detecting a wheel slip by comparing the speed pulse $V_A$ from the vehicle speed sensor 1 with a vehicle speed $V_B$ calculated from the acceleration $\alpha_B$ outputted from the acceleration sensor 2.

The acceleration signal $\alpha_B$ from the acceleration sensor 2 is converted by a vehicle speed calculating circuit 34 into a vehicle speed $V_B$, according to an equation (5).

$$V_B = \int \alpha_B dt + v \qquad (5)$$

where v is the vehicle speed when the integration is started.

The speed $V_B$ and the vehicle speed pulse $V_A$ from the vehicle speed sensor 1 are fed to a vehicle speeds comparison circuit 35 after speed pulse $V_A$ is converted to a voltage $V_A'$, where they are compared according to an equation (6).

$$|V_A' - V_B| > K_2 \qquad (6)$$

$K_2$ is a threshold value for slip detection.

When there is no slip, the output of the vehicle speed sensor 1 changes so as to strictly follow the actual vehicle speed variations. Thus, the values of $V_A'$ and $V_B$ in the equation (4) are almost equal, i.e., $|V_A' - V_B| \leq K_2$. When on the other hand there is a wheel slip, the output of the vehicle speed sensor 1 changes more greatly than the actual vehicle speed variations, so that a large difference occurs between $V_A'$ and $V_B$ in the equation (6), i.e., $|V_A' - V_B| > K_2$. In this way, checking whether or not the equation (6) holds can detect any wheel slip.

Figure 4:
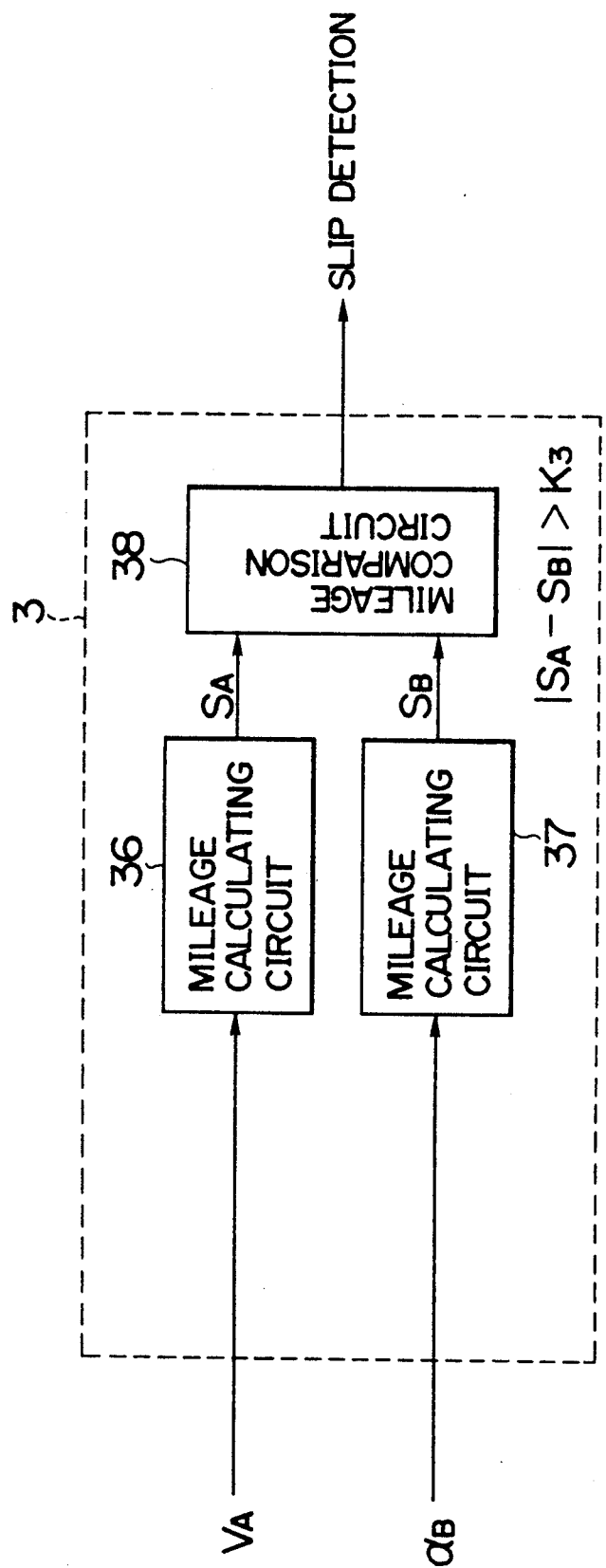
FIG. 4 is a configuration of the slip detecting circuit that employs a traveled distance comparison method.

FIG. 4 shows the process of detecting the wheel slip by comparing the mileage $S_A$ calculated from the speed pulse $V_A$ output from the vehicle speed sensor 1 and the mileage $S_B$ calculated from the acceleration $\alpha_B$ output from the acceleration sensor 2.

The speed pulse $V_A$ from the vehicle speed sensor 1 and the acceleration signal $\alpha_A$ from the acceleration sensor 2 are sent to mileage calculating circuits 36, 37, respectively, where they are converted into mileage $S_A$ and $S_B$ according to equations (7) and (8).

$$S_A = N \times \delta \qquad (7)$$

where N is the total number of pulses and $\delta$ is the distance represented by a single pulse.

$$S_B = \int (\int \alpha_B dt + v) dt \qquad (8)$$

where v is a vehicle speed when the integration is started.

The mileages $S_A$ and $S_B$ thus calculated are fed to the mileage comparison circuit 38, where they are compared according to an equation (9).

$$|S_A - S_B| > K_3 \qquad (9)$$

where $K_3$ is a threshold value for slip detection.

When there is no wheel slip, the output of the vehicle speed sensor 1 changes so as to strictly following the vehicle speed variations, so that $S_A$ and $S_B$ in the equation (9) are almost equal and thus $|S_A - S_B| \leq K_3$. When a slip occurs, however the change in the output of vehicle speed sensor 1 becomes larger than the actual vehicle speed variation and there is a large difference between $S_A$ and $S_B$ in the equation (9). Hence, $|S_A - S_B| > K_3$. It is therefore possible to detect the wheel slip by checking whether or not the equation (9) holds. It is noted that the equations (7) and (8) are identical with the previous equations (1) and (2). Therefore, the same circuit can commonly be used by the mileage calculation circuits 36 and 37 and by the mileage calculation circuit 4 of FIG. 1.

Figure 5:
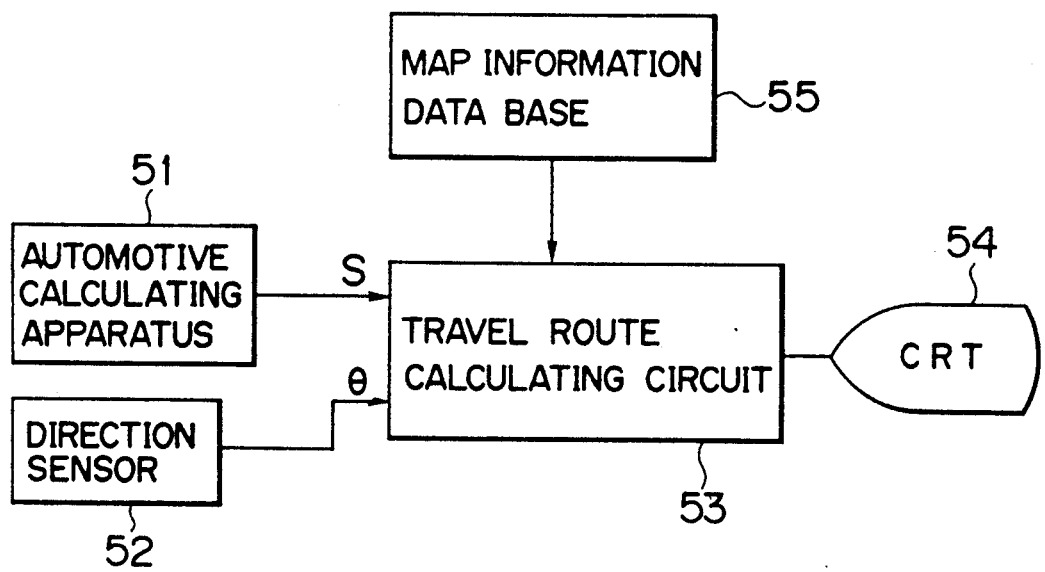
FIG. 5 is an example of an on-board navigation system which utilizes the automotive mileage calculating apparatus of this invention.

FIG. 5 shows one example of an on-board navigation system for automobiles that utilizes the above-mentioned automotive mileage calculating apparatus of the invention. The navigation system uses a combination of the mileage information obtained from the automotive mileage calculating apparatus of the invention and the direction information $\theta$ generated by a direction sensor, to provide a real time display of the vehicle traveling route on a road map.

In the figure, reference number 51 represents the automotive mileage calculating apparatus of this invention shown in FIG. 1; 52 a direction sensor such as a geomagnetic compass; 53 a travel route calculating circuit; 54 a travel route display such as a CRT; and 55 a map information database. The mileage information $S_1, S_2, S_3, \ldots$ calculated as mentioned above is entered from the automotive mileage calculating apparatus 51 of this invention into the travel route calculating circuit 53 one after another at intervals of, say, one second. The travel route calculating circuit 53 also receives, one after another, directional information $\theta$ from the direction sensor 52 representing the direction in which the car is heading. Using this information—the mileage information $S_1, S_2, S_3, \ldots$ and the directional information $\theta$—the travel route calculating circuit 53 computes at very short intervals the route traveled by the car and displays it in real time on the travel route display 54.

Now, by referring to FIG. 6, the method of determining the travel route as performed by the travel route calculating circuit 53 will be described.

Figure 6:
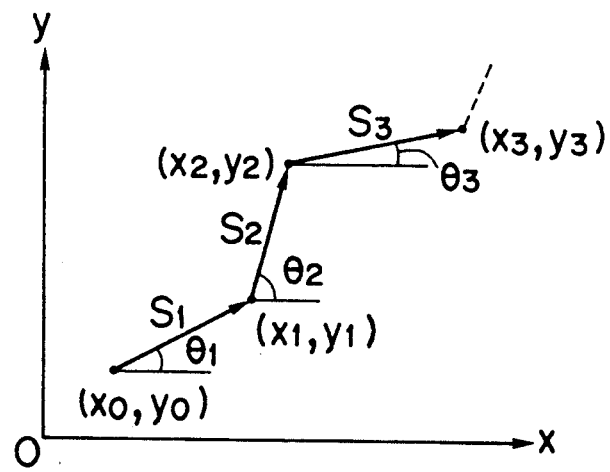
FIG. 6 is a diagram showing how a travel route is determined by the on-board navigation system.

In FIG. 6, it is assumed that the starting point of the vehicle is at $(x_0, y_0)$. When the first mileage information $S_1$ is received from the automotive mileage calculating apparatus 51, the travel route calculating circuit 53 samples the direction information $\theta$ from the direction sensor 52 to obtain the directional information $\theta_1$ associated with the mileage information $S_1$. As a result, it is seen from FIG. 6 that the current position $(x_1, y_1)$ after the car has traveled the distance $S_1$ can be expressed as $$x_1 = x_0 + S_1 \cos \theta_1$$

$$y_1 = y_0 + S_1 \sin \theta_1$$

Then, as the next mileage information $S_2$ is entered, the position of the car $(x_2, y_2)$ can now be given as follows, with the directional information for the mileage information $S_2$ taken as $\theta_2$.

$$x_2 = x_1 + S_2 \cos \theta_2$$

$$y_2 = y_1 + S_2 \sin \theta_2$$

When still another mileage information $S_3$ is supplied, the position of the vehicle at this time $(x_3, y_3)$ is expressed as follows, with the associated directional information taken as $\theta_3$.

$$x_3 = x_2 + S_3 \cos \theta_3$$

$$y_3 = y_2 + S_3 \sin \theta_3$$

Similarly, based on the mileage $S_i$ and the direction $\theta_i$ coming successively, the corresponding car position $(x_i, y_i)$ can be determined. By plotting the position information thus obtained $(x_1, y_1), (x_2, y_2), (x_3, y_3), \ldots$, the route the car has traveled can be displayed continuously.

The position information $(x_i, y_i)$ is sent to the travel route display 54. On the display 54 is shown a road map of the area in which the car is traveling, such a map being retrieved from the map information database 55. Before starting the car, a driver is required to locate the starting point $(x_0, y_0)$ on the road map. As the car travels, the route of the car is traced on the road map in real time.

As mentioned above, when there is a wheel slip, the automotive mileage calculating apparatus according to this invention computes the distance traveled by the vehicle by using the acceleration signal from the acceleration sensor. It therefore can calculate a correct mileage even when the car is making a jerk start or quick stop on a slippery road such a snow-covered, wet or muddy road. The apparatus of this invention can be effectively applied, for example, to the on-board navigation system of an automobile.

What is claimed is:

1. An automotive mileage calculating apparatus for calculating the amount of miles travelled by an automobile during a plurality of time intervals comprising:
   a vehicle speed sensor for generating a vehicle speed signal according to the running speed of the vehicle;
   an acceleration sensor for detecting the acceleration of the vehicle in the direction of travel;
   a slip detecting circuit for detecting a wheel slip according to the speed signal from the vehicle speed sensor and the acceleration signal from the acceleration sensor; and
   a mileage calculating circuit for calculating the mileage, the mileage calculating circuit computing the mileage by using the speed signal from the vehicle speed sensor during time intervals when no wheel slip has been detected by said slip detecting circuit and, by using the acceleration signal from the acceleration sensor during time intervals when a wheel slip has been detected by said slip detecting means.

2. An automotive mileage calculating apparatus as set forth in claim 1, wherein the speed signal from the vehicle speed sensor is a digital pulse voltage signal in which speed information is based on the frequency of said digital pulse voltage signal and the acceleration signal from the acceleration sensor is an analog signal.

3. An automotive mileage calculating apparatus as set forth in claim 1, wherein the slip detecting circuit detects a wheel slip by comparing the acceleration calculated from the vehicle speed sensor's speed signal and the acceleration outputted from the acceleration sensor.

4. An automotive mileage calculating apparatus as set forth in claim 1, wherein the slip detecting circuit detects a wheel slip by comparing the vehicle speed calculated from the vehicle speed sensor's speed signal and the vehicle speed calculated from the acceleration sensor's acceleration signal.

5. An automotive mileage calculating apparatus as set forth in claim 1, wherein the slip detecting circuit detects a wheel slip by comparing the mileage calculated from the vehicle speed sensor's speed signal and the mileage calculated from the acceleration sensor's acceleration signal.

6. An automobile mileage calculating apparatus for calculating the amount of miles travelled by an automobile during a plurality of time intervals comprising:
   a vehicle speed sensor for generating a vehicle speed signal according to the running speed of the vehicle;
   an acceleration sensor for detecting the acceleration of the vehicle in the direction of travel, in such a way that the acceleration is detected independent of said vehicle speed sensor;
   selection means for selecting the detected acceleration during time intervals when said vehicle speed sensor cannot accurately sense the running speed of the vehicle, and for selecting said vehicle speed signal during time intervals when said vehicle speed sensor can accurately sense the running speed of the vehicle; and
   mileage calculating means for calculating the mileage by using an output from said selection means.

* * * * *